United States Patent [19]

Hovden

[11] Patent Number: 5,590,487
[45] Date of Patent: Jan. 7, 1997

[54] HUNTING TRAP DEVICE

[76] Inventor: Hallgeir Hovden, Søndre Vestsida veg 391, N-3670 Notodden, Norway

[21] Appl. No.: 433,502
[22] PCT Filed: Nov. 24, 1993
[86] PCT No.: PCT/NO93/00176
 § 371 Date: May 12, 1995
 § 102(e) Date: May 12, 1995
[87] PCT Pub. No.: WO94/12026
 PCT Pub. Date: Jun. 9, 1994

[30] Foreign Application Priority Data

Nov. 25, 1992 [NO] Norway ............................. 924559
Aug. 20, 1993 [NO] Norway ............................. 932976

[51] Int. Cl.6 ......................................... A10M 23/26
[52] U.S. Cl. ......................................... 43/81; 43/85
[58] Field of Search ........................... 43/77, 81, 85

[56]  References Cited

U.S. PATENT DOCUMENTS

| Re. 11,605 | 6/1897 | Sullivan | 43/85 |
|---|---|---|---|
| 477,966 | 6/1892 | Steiner | 43/85 |
| 600,156 | 3/1898 | Mast | 43/85 |
| 714,281 | 11/1902 | Chassé | 43/85 |
| 824,246 | 6/1906 | Jones | 43/85 |
| 1,218,406 | 3/1917 | Jackson | 43/81 |
| 2,492,957 | 1/1950 | Blair | 43/81 |
| 4,425,732 | 1/1984 | Kania | 43/81 |
| 5,172,512 | 12/1992 | Bodker | 43/81 |
| 5,337,512 | 8/1994 | Krenzler | 43/81 |

*Primary Examiner*—Kurt Rowan
*Attorney, Agent, or Firm*—Young & Thompson

[57]  ABSTRACT

A hunting trap device wherein a spring-tensioned arm (7") moves, when in released state across an entrance opening (2, 2') in the trap, and wherein a release mechanism (4, 5, 6) is disposed within the opening. The opening (2, 2') is preferably circular and is formed both in a front wall (11) and a partition (12) positioned therebehind. The axis of rotation of the arm is located at a level below the lower edge of the opening (2, 2'). The arm (7") is designed to move in an intermediate space between the front wall (11) and the partition (12) and past the lower edge of the opening, the intermediate space preferably being designed with an upwardly convex rest surface (14) at the bottom thereof. The arm (7") is arcuate over a substantial portion of its length, with a curve oriented opposite to the curve at the bottom of the opening in the hunting trap when the arm moves across the opening.

6 Claims, 3 Drawing Sheets

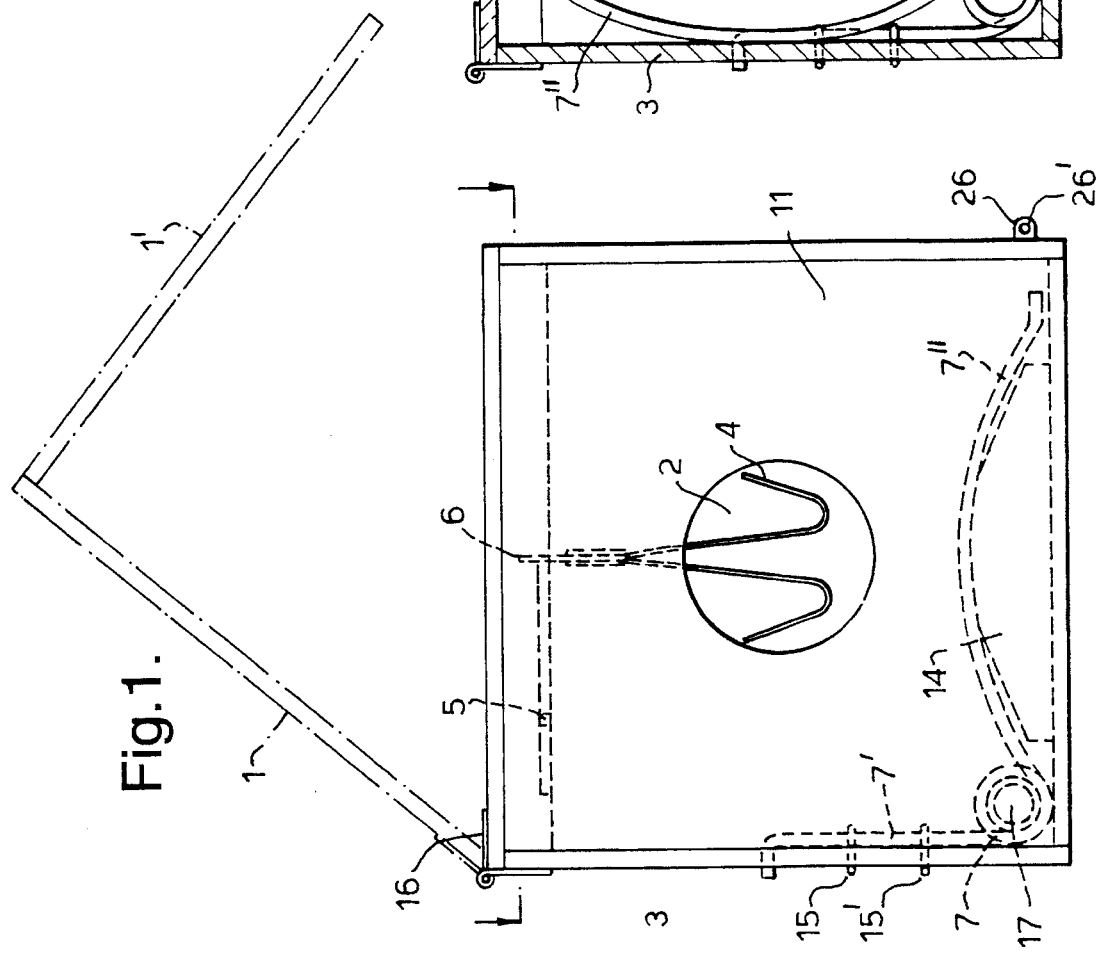

5,590,487

HUNTING TRAP DEVICE

FIELD OF THE INVENTION

The present invention relates to a hunting trap device, wherein a spring-tensioned arm is adapted to move, when in released state, across an opening forming the entrance to the trap, and wherein a trigger means for the arm is disposed at the opening inside the trap, wherein the opening is oval or circular and is formed in both a front wall and a partition positioned therebehind, wherein the axis of rotation of the arm is located at a level below the lower edge of said opening, and wherein the arm is adapted to move in an intermediate space between the front wall and the partition.

BACKGROUND OF THE INVENTION

The device is particularly suitable for a killing trap in which bait is used, primarily for killing fur-bearing game, e.g., martin or mink; but it may also be dimensioned for all types of game, e.g., up to the size of lynx, depending on the proportions of the trap.

From the prior art there are known many types of hunting traps, all having in common the feature that the game animal is destroyed in a less than satisfactory manner, often involving considerable pain for the quarry. This causes problems and inefficiency in the practical hunting process. A number of difficulties are also associated with the freezing solid of the trigger mechanism and striking device when the weather changes from sleet, rain and thaw to frost and extreme cold. Another problem, perhaps equally serious for hunters in certain years, is that mice and lemming may eat up the bait before the intended game approaches the vicinity of the hunting trap. It is also difficult for the hunter to manage to fasten the bait at the correct distance from the striking device so that said device will strike in the right place and thus produce a prompt and effective execution without any notable pain for the animal.

With regard to liquid bait, it has been fruitless up to now to use this type of bait for anything other than a luring means.

There has for a long time been a desire among hunters to utilize a hunting trap that is equipped with bait, and which functions perfectly under all operating conditions, including when it is covered with snow or submerged in water. From U.S. Pat. No. 4,425,732 there is known a solution which utilizes a straight, striker spring arm having a short stroke length, and where the entrance opening to the trap is flat at the bottom. There is a danger with this type of solution that the animal will be pushed to the side of the opening before the arm locks the animal in the trap. With this known solution there is, in fact, a risk that the animal will be gradually strangled instead of being promptly put to death. This risk has been determined by trappers on the basis of their observation of the formation of foam around the animal's mouth, which would confirm that the animal evidently had been alive after the trap was sprung.

SUMMARY OF THE INVENTION

In the light of the fact that the known hunting traps, including the type disclosed in U.S. Pat. No. 4,425,732, inflict needless suffering on the animal when it is killed, the intention of the present invention is to provide a hunting trap device of the type described in the above introduction, which device is characterized, according to the invention, in that the arm is arcuate over a substantial portion of its length, with a curvature oriented opposite to the curvature at the bottom of the opening in the hunting trap when the arm moves across said opening, the curved arm in its released, downward striking state capable of hitting and breaking the neck or spine of an animal located in said opening and lock the animal against said curved bottom of the opening, and that the arm in its released, striking state with said opening unobstructed by an animal is able to move down across said opening and past the lower edge of the opening.

According to one embodiment form of the device, the arm is, in a manner known per se, an integral part of a striker spring, where one free portion of the spring forms the arm and the other free portion forms abutting contact with a fastening bracket.

According to a further embodiment of the device, said intermediate space at the bottom thereof is preferably provided with an upwardly curved arm rest surface.

In addition, it is advantageous that the arm coacts with a fastening bracket, said bracket being provided with a pivotable, L-shaped release lever at an upper section thereof, where one leg of said release lever forms a releasable engagement with a hook on said trigger, and where a second leg is designed to block the striker spring arm in its cocked position from moving into the intermediate space, and where the second leg when actuated by said trigger is designed to rotate away from the path of movement of the striker spring arm. The mechanism will thereby be released easily when the animal comes in contact with the trigger.

BRIEF DESCRIPTION OF THE DRAWINGS

These and additional embodiment forms of the invention will now be explained in more detail with reference to the enclosed figures.

FIG. 1 is a frontal view of a hunting trap, according to the invention, with an open lid.

FIG. 2 is a view of the hunting trap, according to FIG. 1, with a tensioned, or cocked, striker spring, a closed lid and the front wall removed for the sake of clarity.

DETAILED DESCRIPTION OF THE INVENTION

Figure 4:
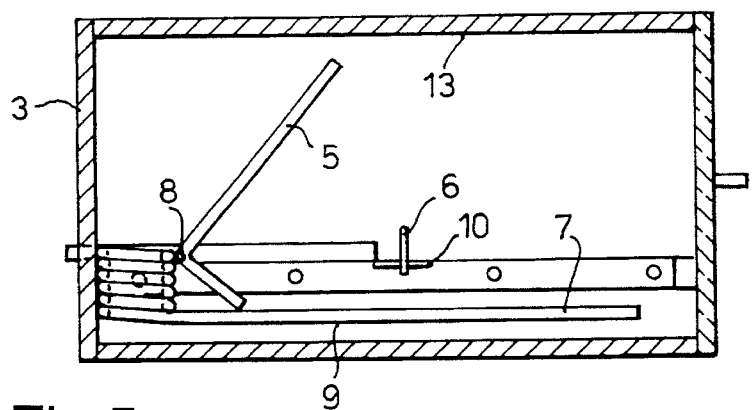
FIG. 4 is a view of the hunting trap, seen from above, without a lid and with the striker spring in released, or tripped, position.

In FIG. 1 the lid 1 is joined along one side thereof with a wall 1'. At the other side edge (to the left in FIG. 1) lid 1 is hinged by means of hinge 16 to a second side wall 3. The lid is constructed in this manner to permit easy access to a striker spring 7 to enable the tensioning (cocking) of the striker spring while at the same time protecting vital functional parts of the trap. On FIGS. 1 and 2, the entrance openings 2 and 2', respectively, may be observed in a front panel 11 and a partition 12. Barrier pins 4, which constitute a part of the release mechanism, can be seen where they are arranged in connection with said entrance opening 2,2'. In FIG. 1 the striker spring 7 is indicated with a dotted line in its rest position (released state). A release lever 5 in tripped state (see also FIGS. 4 and 5) is shown in FIG. 1, while the same release lever in FIG. 2 is shown in tensioned state, with striker arm 7 in cocked position, locked by release lever 5. Release lever 5 is connected via a turn pin 8 to a base plate 9 for the release mechanism. A trigger 6 is also rotataby connected via a hinge joint 10 to the base plate 9 of the release mechanism.

Figure 3:
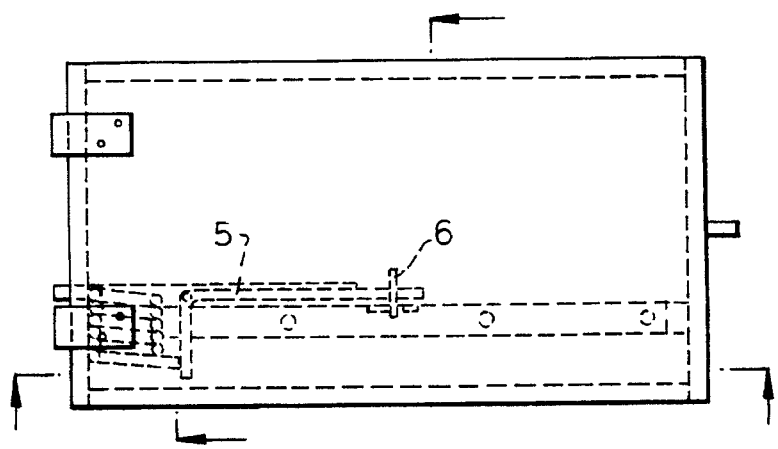
FIG. 3 is a view of the hunting trap, seen from above, with a lid and with a cocked striker spring.
Figure 5:
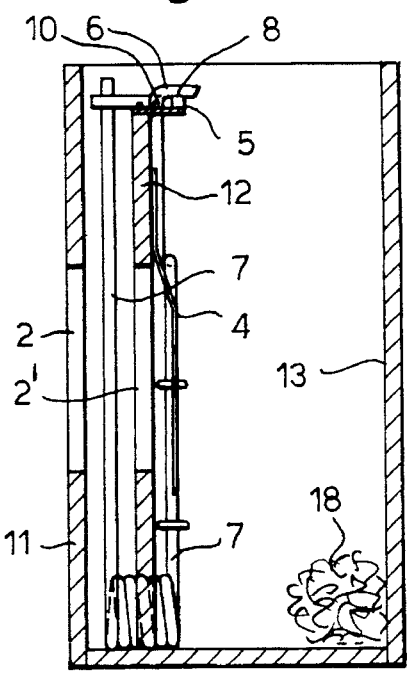
FIG. 5 is a view of the hunting trap, seen from the inside, with the striker spring in cocked position.
Figure 6:
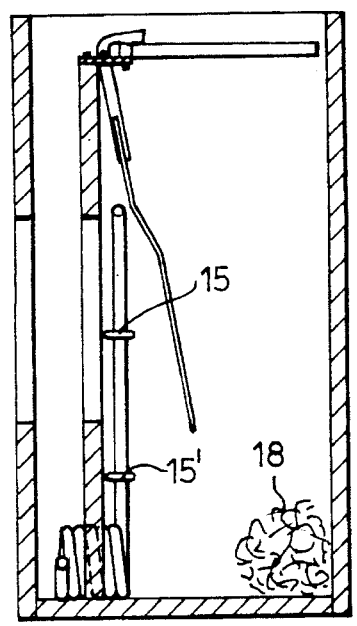
FIG. 6 is a view of the hunting trap, seen from the inside, with the striker spring in tripped position.

Striker spring 7 is preferably attached by one free end thereof to an adjacent side wall 3 by means of fastening clamps 15 and 15'. Alternately, striker spring 7 may be secured in the hunting trap by means of a bolt or the like 17, which projects into the center of the coiled part of the spring. The other free end 7" of the striker spring is longer than said first end 7' and is designed to be arcuate with the convex curve oriented upward. A half-moon shaped rest surface 14 is situated at the bottom of the hunting trap between front wall 11 and partition 12. A section of rest surface 14 has a radius of curvature corresponding substantially to the radius of curvature for said portion 7" of striker spring 7. Portion 7" of striker spring 7 is the striking iron of the hunting trap, intended to strike the game animal and kill it. Spring 7 is provided with sufficient tensional force to cause the end 7", when released, to move down rapidly and with extreme force into the intermediate space between front wall 11 and partition 12. In FIGS. 2, 3 and 5, the end 7" of the striker spring is shown in locked position behind release lever 5 of the release mechanism. Release lever 5 is designed as an angular lever, preferably of an L-shape. The hinge joint 8 may, for example, be formed with the aid of a rivet or other suitable pivotable connection.

Figure 7:
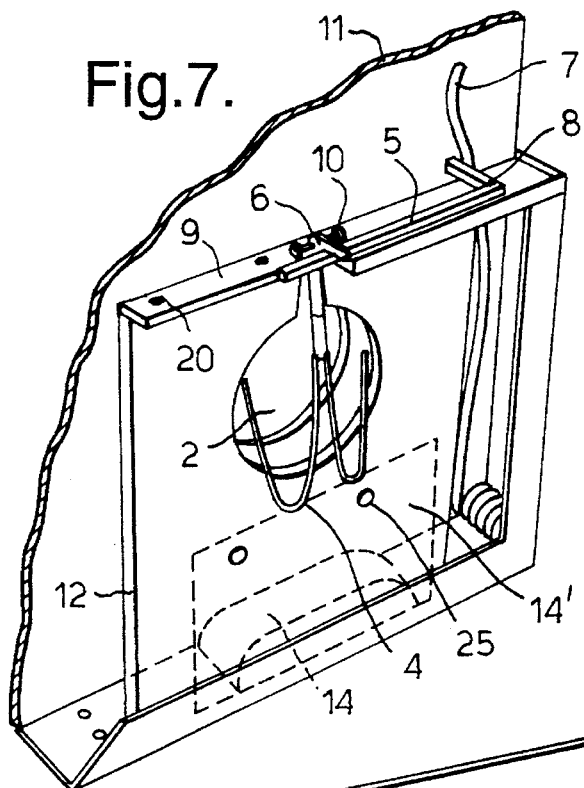
FIG. 7 is a sectional, perspective view of details of the hunting trap, with the striker spring in cocked position.

As is clearly apparent from FIGS. 5 and 7, the longest leg of angular lever 5 is held in place by means of a hook portion on trigger 6.

At a lower section of trigger 6 the barrier pins 4 are attached. In the closed trap a suitable bait 18 is placed. When the animal attempts to enter the trap through opening 2,2', its head will bump against barrier pins 4, whereby trigger 6 will disengage from the spring-tensioned release lever 5. Release lever 5 will thus pivot away from the path of movement for end 7" of the striker arm, whereby this portion 7" is permitted to move down into the intermediate space between front wall 11 and partition 12. According to a preferred embodiment, the hunting trap is bounded at the rearmost part thereof by a rear wall 13. If, however, the hunting trap is intended to be used at the opening of, for example, a cave, hole or the like, where the bait is placed inside the hole, the rear wall 13 may be omitted.

In its released state, striker spring 7 will rest upon said rest surface 14. If the game animal were a martin, for example, it would be left lying with a broken neck in the intermediate space between front wall 11 and partition 12. In this situation, the striking end 7" of striker spring 7 would be lying spanned over said neck.

For the sake of simplicity, said rest surface 14 is not shown on FIGS. 3–6, nor 8, and is only indicated with a dotted line in FIG. 7.

Figure 8:
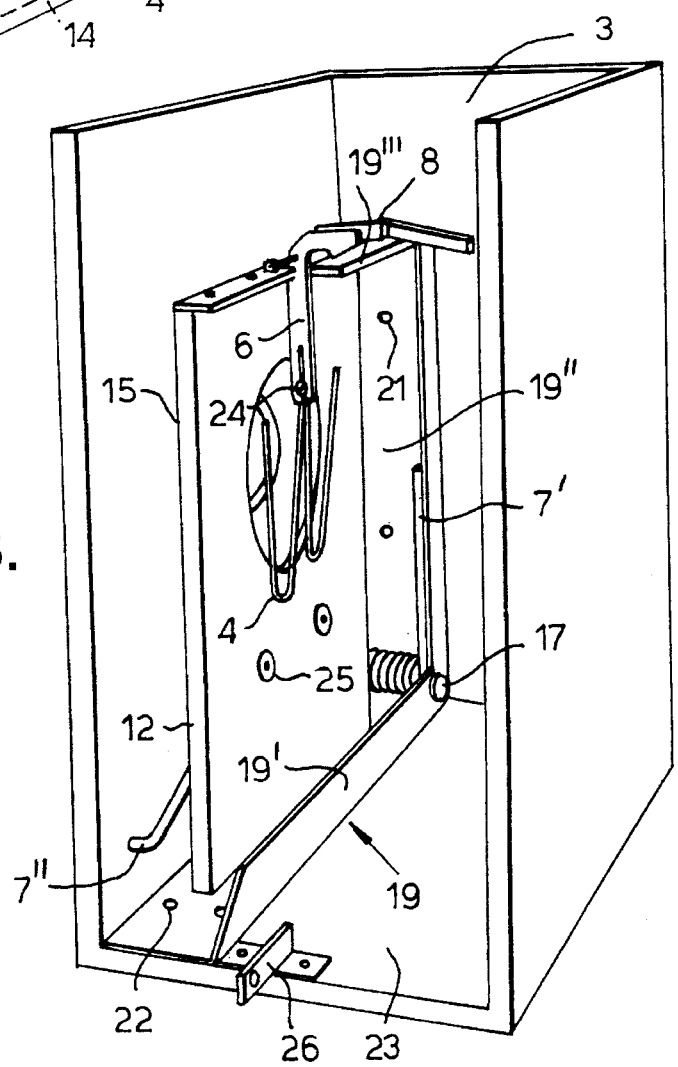
FIG. 8 is a perspective view of the hunting trap, according to the invention, with the striker spring in tripped position.

In a practical embodiment form it would be advantageous to utilize a fastening bracket 19 for striker spring 7 and the release mechanism. In this preferred embodiment form, the fastening bracket has a lower horizontal portion 19', a vertical portion 19" and an upper horizontal portion 19''', which forms an attachment point for the base plate 9 of the release mechanism. Plate 9 is attached by means of screws or rivets 20 to portion 19'''. Similarly, said vertical portion 19" and said lower horizontal portion 19' are fastened to the respective wall 3 and bottom 23 of the hunting trap by means of screws or rivets 21 and 22. In the embodiment form shown in FIG. 8, a bolt 17 is used to fasten the spring to fastening bracket 19. This type of solution also facilitates the possible replacement of spring 7, e.g., with a stronger or weaker spring. As is apparent from FIG. 8, said barrier pins 4 may be attached to trigger 6 by means, for example, of a nut/screw connection 24, or optionally a rivet. Said rest surface 14 may optionally be attached to intermediate wall 12 via fastening plate 14' and fastening rivets 25.

To ensure that the game will not gain access to the bait except through said opening 2,2', the hunting trap is equipped at the bottom thereof with a locking fish plate 26 provided with a hole 26' into which may be inserted a locking means, for example, a steel wire, a split rivet or the like. As will be clearly apprehended from FIGS. 1 and 2, portion 7" of the striker spring will, when moving across the opening, have a curvature oriented opposite to the curvature provided on the lowermost part of opening 2,2' in the hunting trap. By the effect of two such interacting curves, the game or animal is locked in place at the instant of impact against the neck of the game or animal, and breakage of the neck. The movement of the curved spring portion 7" in the intermediate space between front wall 11 and partition 12 provides an almost immediate breakage of the animal's neck or spine. This means that the the animal may die without undue suffering.

Due to the fact that the coiled section of the striker spring is situated near the bottom of the hunting trap, the striking or impact portion 7" of spring 7 will thus have an axis of rotation close to the base of the trap. When the opening 2,2' in the trap is unobstructed by an animal, the striker arm 7" will not only move across opening 2,2', but will also proceed a distance past and below the lower edge of the opening to come to rest against said curved arm rest surface 14. In contrast to the known solution in U.S. Pat. No. 4,425,732 according to which the animal will be choked or merely crushed to death, the present invention through its use of a curved striker arm coacting with the curved bottom of the opening, instead causes the animal's neck to be effectively broken. This is also because the long stroke length of the striker arm produces high speed and thereby a greater whiplash effect as the striker arm hits the animal. According to a preferred embodiment the striker arm moves over an arc of about 90°.

I claim:

1. A device for a hunting trap, comprising a spring-tensioned arm adapted to rotate about an axis of rotation, and move, when in released state, across an opening forming an entrance to the trap, a trigger means for the arm disposed at the opening inside the trap, said opening being oval or circular and being formed in both a front wall and a partition positioned therebehind, the axis of rotation of the arm being located at a level below a lower edge of said opening, the arm being adapted to move in an intermediate space between the front wall and the partition, said arm being arcuate over a substantial portion of its length, with a curvature oriented opposite to a curved bottom of the opening in the hunting trap when the arm moves across said opening, the curved arm in its released and downward striking state capable of hitting and breaking a neck or spine of an animal located in said opening and lock the animal against said curved bottom of the opening, and the arm in its released striking state with said opening unobstructed by an animal being able to move down across said opening and past the lower edge of the opening.

2. A device according to claim 1, wherein the arm is an integral part of a striker spring, with one free portion of the spring forming said arm, and another free portion forming abutting contact with a fastening bracket.

3. A device according to claim 1, wherein said intermediate space below said bottom of the opening is provided with an upwardly curved armrest surface.

4. A device according to claim 2, wherein the fastening bracket is provided with a pivotable, L-shaped release lever at an upper section thereof, with one leg of said release lever forming a releasable engagement with a hook on said trigger means, and a second leg being designed to restrain the striker spring arm in its cocked position from moving into said intermediate space, and said second leg when actuated by said trigger means being designed to rotate away from the path of movement of the striker spring arm.

5. A device for a hunting trap, comprising a spring-tensioned arm adapted to rotate about an axis of rotation, and move, when in released state, across an opening forming an entrance to the trap, a trigger means for the arm disposed at the opening inside the trap, said opening being formed in both a front wall and a partition positioned therebehind, the axis of rotation of the arm being located at a level below a lower edge of said opening, the arm being adapted to move in an intermediate space between the front wall and the partition, said arm in its released and striking state being so arranged as to move down to hit a neck or spine portion of an animal in the opening, said arm coacting with a fastening bracket, said bracket being provided with a pivotable L-shaped release lever at an upper section thereof, one leg of said release lever forming a releasable engagement with a hook on said trigger means, and a second leg being designed to restrain said arm in its cocked position from moving into said intermediate space, and said second leg when actuated by said trigger being designed to rotate away from the path of movement of the arm.

6. A device according to claim 5, wherein the opening is one of oval and circular.

* * * * *